Nov. 10, 1931.  P. MASI ET AL  1,831,253
AEROPLANE
Filed Aug. 10, 1928  2 Sheets-Sheet 2
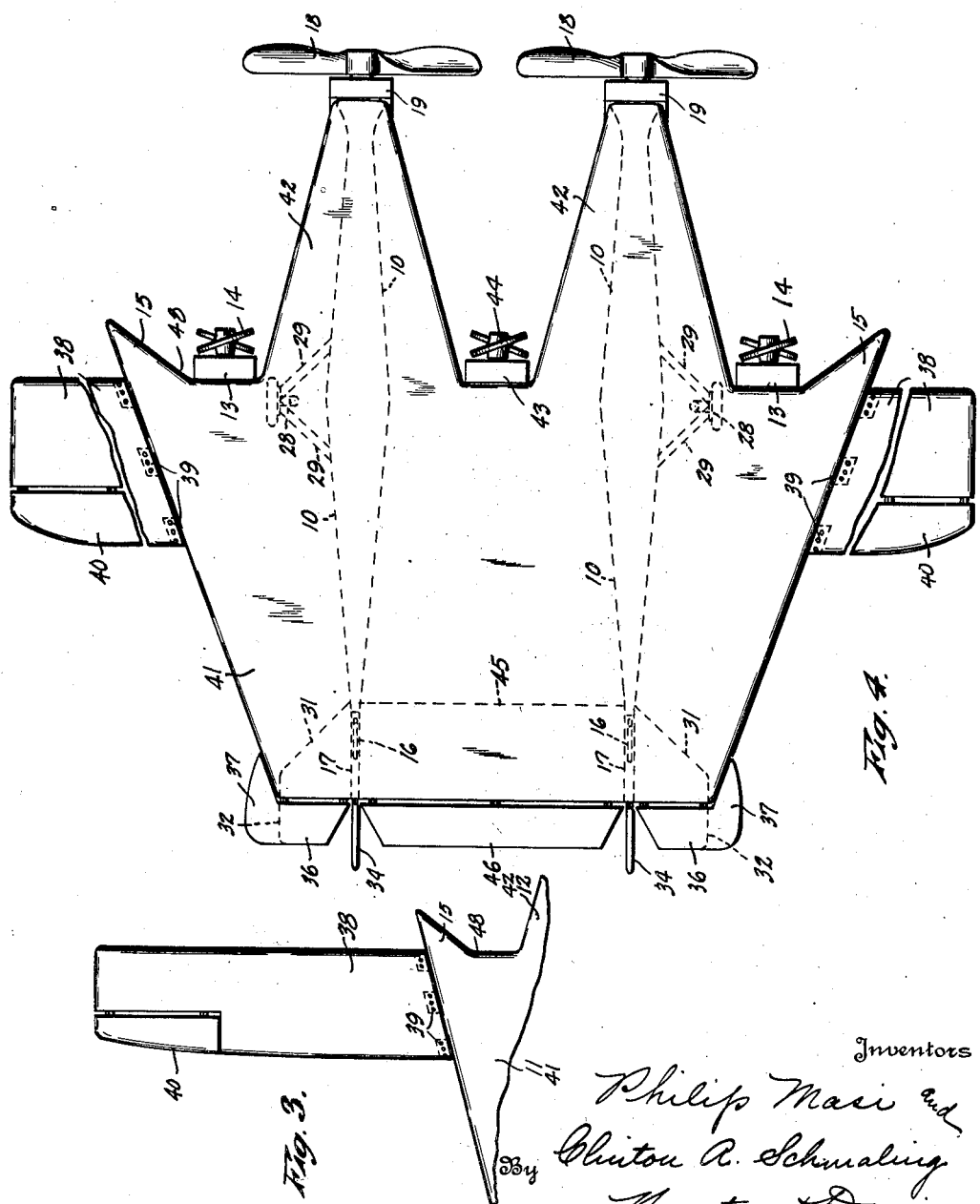

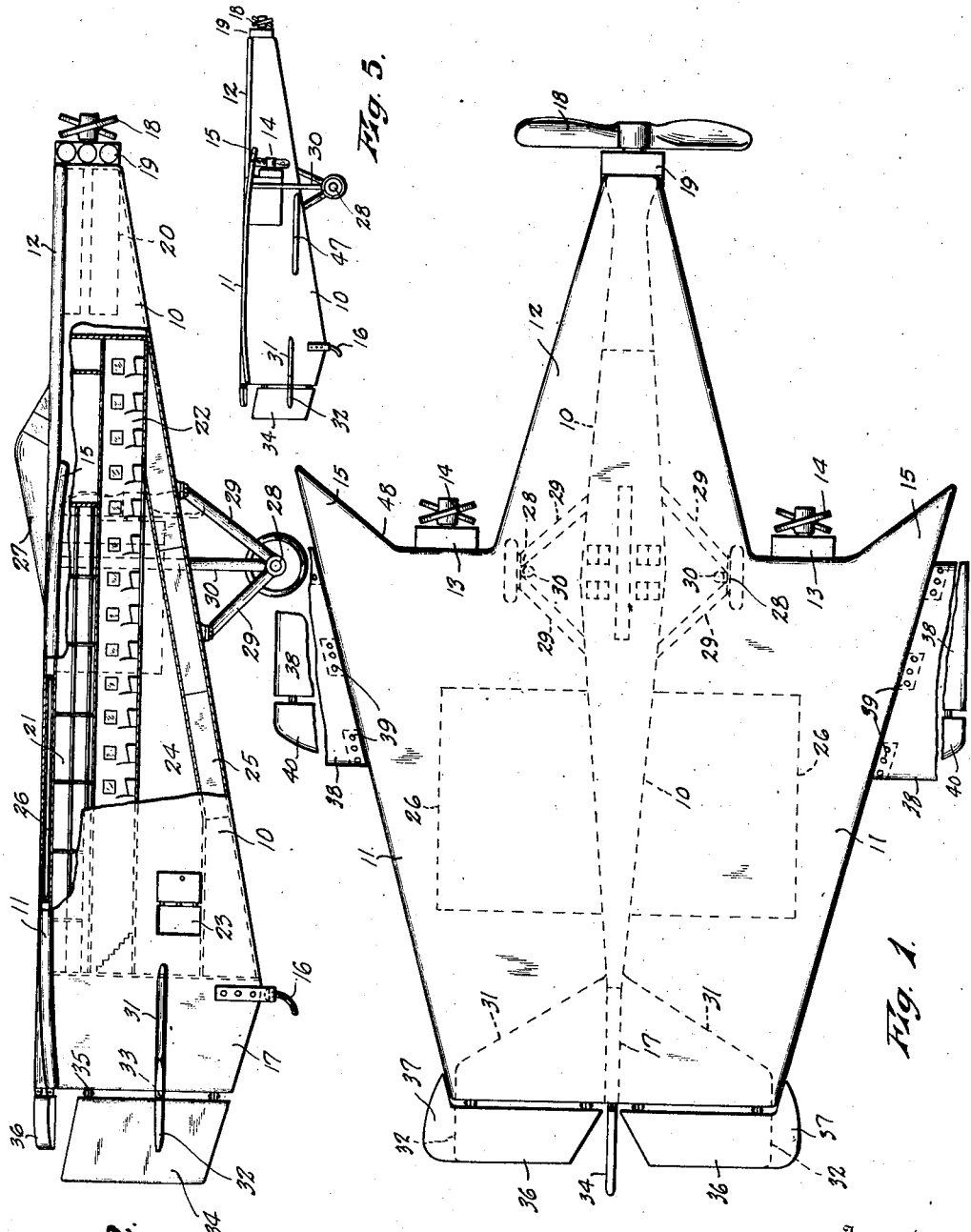

Patented Nov. 10, 1931

1,831,253

UNITED STATES PATENT OFFICE

PHILIP MASI AND CLINTON A. SCHMALING, OF PORT CHESTER, NEW YORK

AEROPLANE

Application filed August 10, 1928. Serial No. 298,678.

This invention relates to aeroplanes or aircraft of the heavier than air type, and has for an object to provide a structure and a relative proportion and arrangement of parts to give a greater lift and a greater wing surface with less spread or overhang of the wings than in the common type of aeroplane, thus increasing carrying capacity, decreasing liability of the wings failing or crumpling, and eliminating the struts or greatly reducing the number required and thus reducing wind resistance.

It is also an object of the invention to provide an improved fuselage construction and arrangement which will prevent side slip and give greater stability.

It is another object to provide an improved construction with which may be used the same or standard controls of the present day planes so that the pilot when operating this machine will not be required to learn new controls.

It is a still further object of the invention to provide a construction in which there is wing support for substantially the entire length of the fuselage so that a load can be carried from end to end of this fuselage.

With the foregoing and other objects in view, the invention consists in certain novel features of construction, combinations and arrangements of parts as will be more fully described in connection with the accompanying drawings. In these drawings, Fig. 1 is a top plan view of our improved aeroplane with a single fuselage.

Fig. 2 is a partial side elevation and partial longitudinal section thereof.

Fig. 3 is a partial plan view of one side of a wing showing a detachable wing section applied thereto.

Fig. 4 is a top plan view showing a double arrangement of this plane, and

Fig. 5 is a side elevation on a reduced scale showing how a lower or second wing may be used.

Referring first to Figs. 1 and 2 our improved aeroplane is primarily a monoplane although a second wing may be added if desired, as indicated in Fig. 5. The aeroplane includes a longitudinally extending fuselage 10 of considerable length and a plane 11 extending laterally from the upper part thereof forming the wings of the plane. These wings extend longitudinally of the fuselage for substantially the entire length thereof to thus give support for the fuselage for substantially its entire length. This also gives greater lift and greater wing surface without having excessive overhang of the wings, and therefore, the wings will be less likely to fail or crumple up, and besides a great proportion of the usual struts required in wings having a large overhang are done away with or these struts may be even eliminated entirely. The wings or plane are substantially the shape shown in Fig. 1 with the widest portion preferably adjacent the center of gravity of the craft, and it tapers both toward the front and rear. The taper toward the front, however, as indicated at 12 is not from the outer edges of the widest portion of the plane or wings but is inwardly thereof as shown, leaving space for a pair of engines 13 and propellers 14. The tapered forward portion of the wings or plane extend to substantially the front end of the fuselage and provides lift for the forward portion thereof. It is preferred to have the widest part of the wing extend somewhat forwardly and pointed downwardly somewhat, as shown at 15, so as to bite better into the wind. The wings or plane are preferably curved somewhat as indicated in Fig. 2.

The fuselage, as indicated in Fig. 1, is tapered or given stream lines both to the front and rear as indicated, to reduce air resistance and is of a relatively great height, as indicated in Fig. 2, the height just in front of the skid 16 being preferably substantially one-half of the width of the wing adjacent its widest part but not necessarily so as there may be considerable variation, and extending from the rear end of this fuselage to the end of the plane 11 is an upright fin 17 which is really an extension of the fuselage. This arrangement of fuselage and fin practically eliminates side slip, or at least reduces it to a minimum because of the great lateral or upright surface provided, and it also gives the machine greater stability. The longitudinal arrangement of the wings with this fuselage gives a high lift wing as all the wing is lifting, and it gets the full benefit of the slip stream of the forward propeller 18 which, of course, is driven by any suitable type of motor indicated diagrammatically at 19, and this slip stream is split by this relatively high fuselage. The wing is thus biting the air from the front of the fuselage for substantially its entire length giving a larger lifting surface with less wing spread or overhang.

This type of fuselage and wing arrangement also permits the carrying of larger loads and which may be more easily provided for. That is, the load may be distributed throughout substantially the entire length of the fuselage. For instance, fuel tanks 20 may be carried in the front portion thereof and the higher portions of the fuselage may be divided into separate levels or floors. For instance, sleeping quarters 21 may be provided in the upper top level while seats for passengers may be provided in the next lower level, as shown at 22. Entrance may be through a door 23 at the rear portion of the side of the fuselage with a runway 24 leading to the level 22. The lower level or above the keel may provide a space 25 for cargo or fuel tanks, and, of course, these may also be stored in the upper level 21 if preferred. Fuel tanks 26 may be provided in the wings. The pilot's cabin 27 is preferably at the top of the plane and projected above the same to increase visibility and also to provide greater space in the fuselage. The landing gear 28 including struts 29 to the fuselage and strut 30 to the under side of the wing may be of any standard type.

Horizontal stabilizer fins 31 are also provided extending laterally outward from the rear end of the fuselage and the vertical fin 17. The craft is controlled with standard or the same type of controls as are used on the present day aeroplanes, so that the pilot to operate this machine will not be required to learn new controls. It includes horizontal stabilizers 32 hinged at 33 to the rear ends of the fins 31 so that they may swing in vertical planes, and a vertical rudder 34 hinged at 35 to the vertical rear edge of the upright fin 17. Hinged ailerons 36 are hinged to the rear edge of the wings 11 to give the proper control and they may or may not extend outward to overlap the edge of the wings, as shown at 37, as is found desirable or necessary to prevent wing flutter.

The engines and propellers 13 and 14 may be omitted if desired. If found desirable we may increase the lifting effect and overhang of the wing surface by adding detachable wing sections 38. Ordinarily, however, these will not be used, but may be added to increase the lift or spread as is found desirable. Any suitable means 39 is provided for detachably connecting them to the wings or plane 11, and they may have the usual hinged ailerons 40.

This type of aeroplane lends itself very nicely to a doubling up arrangement for greatly increasing its carrying capacity. This is shown very clearly in Fig. 4 in which substantially two of the single constructions of Fig. 1 have been added together to form a single aeroplane. This is done by adding the planes or wings to make a substantially double plane 41 and using two fuselages 10 in parallel relation placed the proper distance apart. The plane or wings extend in a continual wing between these two fuselages, and it will have two tapered portions 42 extending forwardly from the widest part thereof corresponding with the tapered portion 12 over the forward portion of the single fuselage of Fig. 1, there being one of these tapered portions 42 for each fuselage 10, and having the same relation with respect to its corresponding fuselage as the portion 12 of the single form. Each fuselage will have the propeller 18 and motor 19 at its foward end as in the single form and there may be two additional motors and propellers 13—14 placed laterally outwardly of the fuselages and an additional motor 43 and propeller 44 between the two fuselages. The controls of this double form are practically the same as that of the single form with laterally extending stabilizer fins 31 and stabilizers 32. There is a continuous horizontal fin 45 extending between the rear ends of the fuselages and the upright fins 17. There are two or more upright rudders 34 one for each upright fin 17, and the usual ailerons 36 at the rear edges of the wings, together with an additional aileron 46 at the rear edge of the central portion of the wings or plane between the two fuselages. If desired, detachable wing sections 38 may be used with this double construction the same as indicated for the single construction.

Although as indicated, this aeroplane is normally a monoplane an additional plane or wing 47 may be added below the main plane or wing, as indicated in Fig. 5. This is detachably secured to the sides of the fuselage and extends laterally outwardly therefrom to increase the plane surface and the lifting ability.

From the foregoing description it will be obvious that a comparatively large plane or wing surface is secured with this construction and arrangement, and therefore, more lift without excessive overhang of the wings from the fuselage. The nearer the front 48 of the widest portion of the wing is to the nose the more is the lift, but this decreases the speed, the speed being greater when this edge is farther away from the nose. As indicated above, the depending fuselage of relatively great height splits the slip stream of the draft of the propeller 18 and provides a great lateral surface which gives great resistance to slide slip, and its height may, if desired, be substantially one-half the width of the wings at the center of gravity of the craft. As the wings have a relatively small overhang the size to which these planes may be built is not limited as are planes with the outstretched wings. As the fuselage is supported for substantially its entire length it may be loaded practically from end to end, while in the ordinary plane most of the load must be located near the center of gravity.

Having thus set forth the nature of our invention, what we claim is:

1. In an air craft, a longitudinally extending fuselage, a plane projecting laterally from the upper part thereof and extending longitudinally substantially the length of the fuselage, vertical and horizontal stabilizing fins at the rear, the widest portion of the plane being adjacent the center of gravity of the craft and the plane being tapered toward the rear, said plane including a front portion extending forwardly from the front edge of said widest portion and tapered toward the front with its rear end portion considerably less in width than the widest portion of said plane, and wings extending outwardly from the lateral side edges of said plane adjacent its widest portion.

2. In an air craft, a longitudinally extending fuselage, a longitudinally extending wing or plane extending for the greater portion of the length of the fuselage and projecting laterally from the upper portion thereof, the widest portion of said plane being spaced rearwardly from the nose of the fuselage and tapered toward the rear, the front portion of the plane extending from the front edge of the widest portion and tapered toward the front with the widest part of this front portion considerably less in width than the greatest width of the plane, and a motor and propeller at the forward end of the fuselage.

3. In an air craft, a longitudinally extending fuselage, a longitudinally extending wing or plane extending for the greater portion of the length of the fuselage and projecting laterally from the upper portion thereof, the widest portion of said plane being spaced rearwardly from the nose of the fuselage and tapered toward the rear, the front portion of the plane extending from the front edge of the widest portion and tapered toward the front with the widest part of this front portion considerably less in width than the greatest width of the plane, the fuselage being relatively narrow transversely and of relatively great height or depth so as to depend a sufficient distance below the plane to provide a relatively large lateral surface to resist side slip, and a driving propeller at the forward end of the fuselage.

4. In an air craft, a longitudinally extending fuselage, a longitudinal wing or plane extending substantially the entire length of the fuselage and projecting laterally therefrom adjacent the top thereof, the said plane being widest intermediate its length and tapered to the rear, said plane also having a front portion tapered to the front but with its rear widest part of considerably less width than the widest part of the plane, a motor and propeller at the forward end of the fuselage, a motor and propeller on each side of the fuselage at substantially the forward edge of the widest part of the plane, and vertical and horizontal fins at the rear end of the fuselage.

5. In an air craft, a longitudinally extending fuselage, a longitudinal plane or wing extending for substantially the entire length of the fuselage, said fuselage being of relative great height or depth so as to depend from the plane sufficiently to provide a large lateral surface to resist side slip, said plane being tapered toward the front and rear, and outstretched wing sections detachably secured to and extending outwardly from the opposite lateral edges of the first plane.

6. In an aircraft, a longitudinally extending fuselage, a longitudinally extending wing or plane extending for the greater portion of the length of the fuselage and projecting laterally from the upper portion thereof, the widest portion of said plane being spaced rearwardly from the nose of the fuselage and tapered toward the rear, the front portion of the plane extending from the front edge of the widest portion and tapered toward the front with the widest part of this front portion considerably less in width than the greatest width of the plane.

7. In an air craft, a longitudinally extending fuselage, a longitudinally extending wing or plane extending for the greater portion of the length of the fuselage and projecting laterally from the upper portion thereof, the widest portion of said plane being spaced rearwardly from the nose of the fuselage and tapered toward the rear, the front portion of the plane extending from the front edge of the widest portion and tapered toward the front with the widest part of this front portion considerably less in width than the greatest width of the plane, the fuselage being relatively narrow transversely and of relatively great height or depth so as to depend a sufficient distance below the plane to provide a relatively large lateral surface to resist side slip.

8. In an air craft, a longitudinally extending fuselage, a longitudinal wing or plane extending substantially the entire length of the fuselage and projecting laterally therefrom adjacent the top thereof, the said plane being widest intermediate its length and tapered to the rear, said plane also having a front portion tapered to the front, but with its rear widest part of considerably less width than the widest part of the plane, a motor and propeller on each side of the fuselage at substantially the forward edge of the widest part of the plane, and vertical and horizontal fins at the rear end of the fuselage.

9. In an air craft, a longitudinally extending fuselage, a longitudinal wing or plane extending substantially the entire length of the fuselage and projecting laterally therefrom adjacent the top thereof, the said plane being widest intermediate its length and tapered to the rear, said plane also having a front portion tapered to the front but with its rear widest part of considerably less width than the widest part of the plane, and vertical and horizontal fins at the rear end of the fuselage.

10. In an air craft, a longitudinally extending fuselage, a longitudinal plane or wing extending for substantially the entire length of the fuselage, said fuselage being of relative great height or depth so as to depend from the plane sufficiently to provide a large lateral surface to resist side slip, said fuselage being of increasing height from the front to the rear, said plane being tapered toward the front and rear, and outstretched wing sections extending outwardly from the opposite lateral edges of the plane.

11. In an air craft, a longitudinally extending fuselage, a longitudinally extending wing or plane projecting laterally from the opposite sides of the fuselage and extending longitudinally thereof for the greater part of its length, the said plane being widest intermediate its length and tapered toward the rear, the front portion of the plane being tapered toward the front, but having its rear or widest part of less width than the widest part of the first mentioned portion and wings projecting outwardly from the lateral edges of said plane adjacent the widest portion thereof.

12. In an air craft, a longitudinally extending fuselage, a plane projecting laterally from and merging with the upper part thereof and extending longitudinally substantially the length of the fuselage, the widest portion of the plane being adjacent the center of gravity of the craft and the plane being tapered toward the front and rear, the fuselage being of increasing height from front to rear, and outstretched wing sections extending outwardly from the opposite lateral sides of the plane.

13. In an air craft, a plurality of longitudinally extending laterally spaced fuselages, a longitudinal wing or plane extending for the greater portion of the length of the fuselages and covering the space between them and projecting laterally from their opposite sides, the said plane being widest intermediate its length and tapered to the rear, said plane also having a front portion tapered to the front but with the widest part thereof of considerably less width than the widest part of the plane, and vertical and horizontal fins at the rear ends of the fuselages.

14. In an air craft, a plurality of longitudinally extending laterally spaced fuselages, a longitudinally extending wing or plane extending for the greater portion of the length of the fuselages and covering the space between them and projecting laterally from their opposite sides, the widest portion of said plane being spaced rearwardly from the noses of the fuselages and tapered toward the rear, said plane also having a front portion extending from the front edge of the widest portion over each fuselage and tapered toward the front with the widest parts of these front portions considerably less in width than the greatest width of the plane.

15. In an air craft, a longitudinally extending fuselage, a plane projecting laterally from and merging with the upper part thereof and extending longitudinally substantially the length of the fuselage, the widest portion of the plane being adjacent the center of gravity of the craft and the plane being tapered toward the rear, the fuselage being of increasing height from front to rear, and outstretched wing sections extending outwardly from the opposite lateral sides of the plane.

16. In an air craft, a plurality of longitudinally extending laterally spaced fuselages, a longitudinally extending wing or plane extending for the greater portion of the length of the fuselages and covering the space between them and projecting laterally from their opposite sides, the widest portion of said plane being spaced rearwardly of the noses of the fuselages and tapered toward the rear, and wings extending laterally from the opposite outer side edges of the plane.

In testimony whereof we affix our signatures.

PHILIP MASI.
CLINTON A. SCHMALING.